May 10, 1927. 1,628,185
F. R. PETERS
DRIVING APPARATUS FOR LOCOMOTIVE BOOSTER MOTORS
Filed June 10, 1924
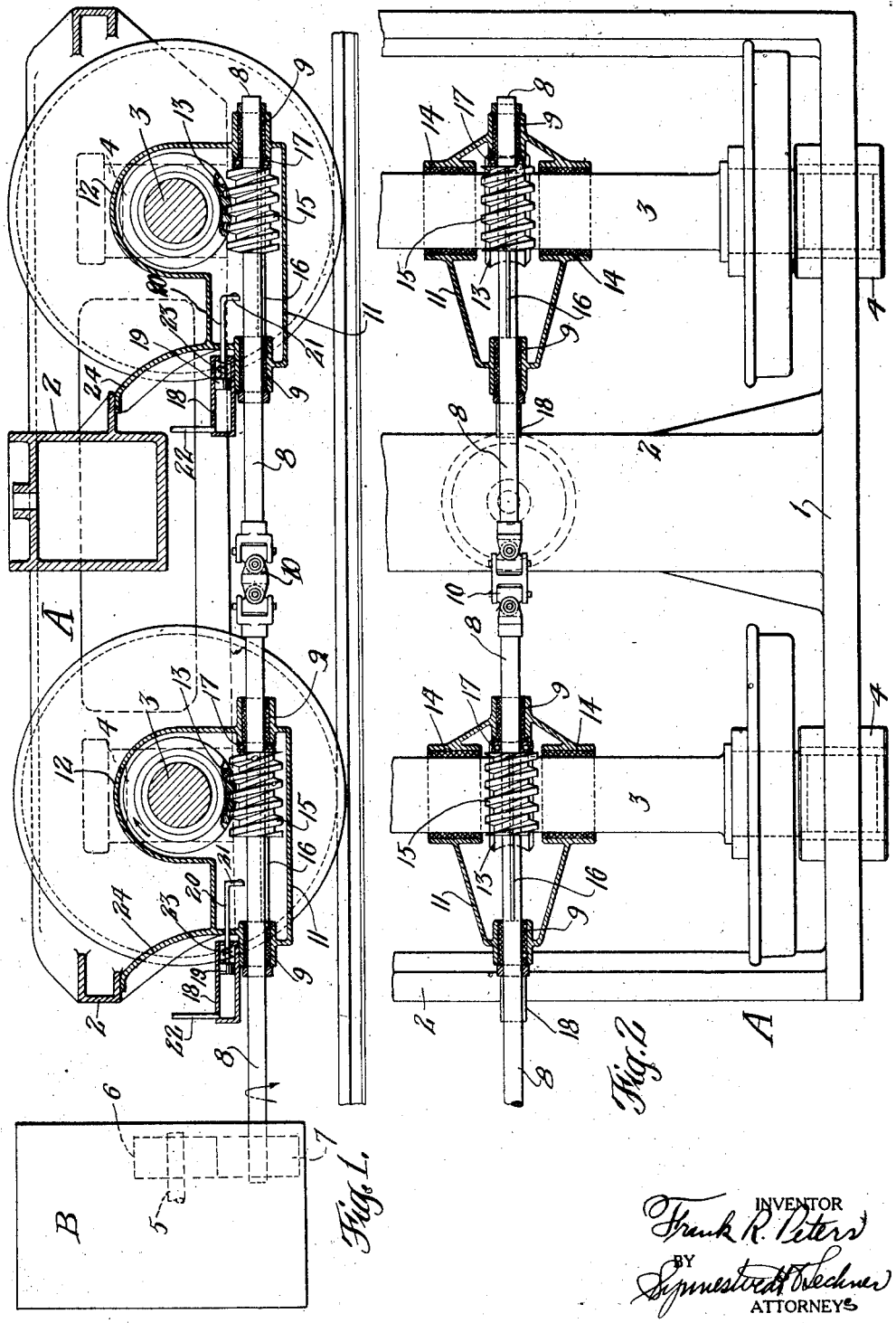

Patented May 10, 1927.

1,628,185

UNITED STATES PATENT OFFICE.

FRANK RICHARD PETERS, OF NEW YORK, N. Y., ASSIGNOR TO FRANKLIN RAILWAY SUPPLY COMPANY, A CORPORATION OF DELAWARE.

DRIVING APPARATUS FOR LOCOMOTIVE BOOSTER MOTORS.

Application filed June 10, 1924. Serial No. 719,149.

This invention relates to a novel and improved form of drive particularly suitable for use in connection with booster supplemented locomotives.

As is now well known in this art a locomotive booster is designed to drive a normally idle weight supporting axle or axles, that is an axle other than those to which the driving wheels are attached. The wheels of such other axles are generally of considerably smaller diameter than the driving wheels and since the booster motors are of relatively small dimensions they are designed to be used only when starting or at low speeds of the locomotive. In other words after the locomotive gets a good start arrangements are generally provided for disconnecting the booster motor.

Boosters so far have been applied most often to a truck having a single axle with its wheels but it has been proposed and it would obviously be advantageous to apply the power of the booster motor to a pair of adjacent axles such as would be found in a four wheel truck either under the engine or under the tender. The power of the booster is applied to one of the axles and the two axles are connected together by means of side rods on the wheels. Side rods however, on wheels as small as is customarily found on the trucks which are driven by the booster motor, had to operate at extremely high speeds and consequently they had to be made especially strong and heavy. Even so there is danger of breakage and derailment of the train when the locomotive is running at high speed.

With the foregoing in mind one of the primary objects of my invention will be better understood, namely, to provide a driving connection between a booster motor and two or more axles which will be connected up to the axles only during periods of booster operation. In other words I so connect the axles which are to be driven by the booster motor so that they are readily disconnectible when the booster is not in operation. I provide a driving or power shaft for the axles which extends from the booster motor transversely past said axles and I arrange said power shaft so that it will take care of relative movement between the axles. It is also an object of my invention to provide fluid actuating means for bringing about the driving connection between the power shaft and the several axles, said fluid actuating means being supplied with fluid either from the booster controlling system or from some independent source as desired.

The foregoing together with such other objects as are incident to my invention I obtain by means of a construction which is illustrated in preferred form in the accompanying drawing, wherein:

Fig. 1 is a vertical longitudinal section through a four wheel truck showing my improvements applied thereto and Fig. 2 is a partial bottom view of the structure of Fig. 1 with certain parts in section for the purpose of illustrating the invention.

Referring to the drawing it will be seen that I have illustrated the invention as applied to a truck having two axles and four wheels but it will be understood of course that the invention could be adapted for use in connection with a truck having more than two axles. The truck indicated as a whole by the reference letter A may include longitudinal side members 1 and intermediate cross members 2 of any desired shape or character and the axles 3 may revolve in bearing boxes 4 carried by the side members 1. A booster of any desired type and illustrated in a purely diagrammatic manner by the reference character B is arranged to drive the axles 3 through the medium of the booster crank shaft 5, driving pinion 6 and gear 7 on the power or drive shaft 8, which latter extends longitudinally of the truck and transversely of the axles in a position slightly below the axles. At each axle the shaft 8 may be mounted in suitable bearings 9, of which I have shown two at each axle. Between each group of two bearings and, therefore, between each pair of axles I provide any suitable form of flexible connection 10. As shown I prefer to locate the shaft 8 substantially centrally of the truck although this would not be essential.

The bearings 9 are carried in a housing or casting 11 formed with an upwardly extending portion 12 within which is housed a worm gear 13 mounted on the axle 3 and in fixed relation to said axle. The housing has extensions at either side of the worm gear 13 within which are mounted bearings 14 surrounding the axles 3.

The housing 11 is formed with an extension to one side of and slightly below the axle 3 into which the worm 15 can be moved when the booster is not in operation. As will be seen from the drawing this worm 15 is mounted for longitudinal movement along the shaft 8 and is non-rotatively secured thereto by means of the key 16. In the figures the worm 15 is shown in its operative or driving position but it will be understood that it can be moved to the left when it is not desired to drive the booster. In driving position the worm is adapted to abut against a thrust bearing 17.

Assuming that the booster is not in operation and that the worm 15 is in its left hand position I provide the following mechanism for moving the worm 15 into driving position where it meshes with the worm wheel or gear 13 on the axle 3. A small cylinder 18 is mounted at some suitable place upon the housing 11 within which is a piston 19 having its rod 20 extending into the housing 11 toward the worm 15. A down-turned extension 21 is adapted to come into contact with the worm 15. The piston 19 is fluid actuated in one direction by means of fluid admitted through the pipe 22 and the spring 23 aids in returning the piston 19 but the piston does not depend upon such spring for its return.

Still assuming that the worm 15 is in its left hand position and the piston 19 is also in its left hand position within the cylinder 18, air pressure or other fluid pressure is admitted to the cylinder 18 through the pipe 22 which causes the piston 19 to move outward or to the right and in so doing it slides the worm 15 along the shaft 8 until it just comes into contact or engagement with the worm gear 13. The shaft 8 is, of course, rotating at this time since it is desired to throw in the power of the booster motor, and the rotation of the shaft works the worm 15 along the shaft after it has initially engaged the gear 13 until it abuts against the thrust bearing 17 as previously described. The booster motor is then connected and becomes a driving factor in the operation of the locomotive. When it is desired to cut out the booster, pressure in the cylinder 18 is released through the pipe 22 and power is turned off from the booster engine. Thereupon the axle 3 with the gear 13 mounted thereon which, it will be understood, is rotating now that the locomotive has gotten under way, will force the worm 15 back along the shaft to its left hand position out of engagement with the worm 13. In this way the axles and the driving shaft 8 are automatically disconnected whenever the power to the booster motor is shut off and the fluid pressure in the cylinder 18 released. With this arrangement each axle with its wheels can be made to do its full share of driving work without the necessity of coupling one axle to the other by means of side rods on the wheels as has heretofore been the practice where the booster motor is arranged to drive but one of the axles.

The housing or casting 11 is provided with an upwardly extending rib 24 which is adapted to come into engagement or contact with the underside of the cross member 2 in order to prevent the tendency to rotate the housing 11 while the booster is in operation.

Fluid pressure may be supplied to the cylinder 18 through the pipe 22 either from the booster control system now well known in this art or from an independent source as desired. In other words whenever the booster is turned on, so to speak, the parts may be arranged so that fluid pressure is automatically delivered to the cylinder 18 or when the booster is to be thrown into operation fluid pressure may be independently thrown into the cylinder 18, if, for any reason, such an arrangement would seem to meet a given set of operating conditions to better advantage.

I claim:

1. In combination with a locomotive booster motor and a plurality of axles to be driven thereby, a shaft driven by the booster motor extending transversely of the axles for interconnecting them, and means for effecting a driving connection between said axles and said shaft which connection is immediately broken when the booster power is cut off.

2. Apparatus for applying the power of a locomotive booster motor to two or more axles which comprises in combination, a shaft extending past the axles for interconnecting them and coupling means between said shaft and the axles which is self-releasing when the booster power is cut off.

3. A drive for a plurality of vehicle axles comprising in combination, a power shaft transverse of the axles for interconnecting them, and driving connections between said shaft and the axles which are automatically disconnectible when the power shaft is idle.

4. A driving mechanism for locomotive booster motors comprising in combination with a plurality of axles to be driven by the booster, a driving shaft transverse of said axles, a flexible coupling in the shaft between axles, worm wheels on the axles, worms on the shaft shiftable therealong from idle position to driving position where they mesh with the worm wheels, and a series of fluid actuated means for starting the worms along the shaft to engage the worm wheels.

5. A driving mechanism for locomotive booster motors comprising in combination with front and rear axles to be driven by the booster, a driving shaft transverse of said axles, and means for operatively coupling the axles to the said shaft whenever the power of the booster motor is desired and uncoupling them at other times.

6. In combination with a locomotive booster motor and an axle to be driven thereby, a worm wheel on the axle, a shaft driven by the booster motor, a worm on the shaft shiftable longitudinally thereof to engage the worm wheel, and a fluid operated piston for shifting the worm to engage it with the worm wheel.

7. A booster drive comprising in combination with the axle which the booster rotates, a shaft revolved by the booster, a worm wheel on the axle, a worm on the shaft shiftable therealong from idle position to driving position where it meshes with the worm wheel, and fluid actuated means for starting the worm along the shaft to engage the worm wheel.

8. A drive comprising in combination, a power shaft, a second shaft transverse thereof to be driven thereby, a worm wheel on the second shaft, a worm on the power shaft shiftable therealong from idle position to driving position where it meshes with the worm wheel, means for starting the worm along the shaft to engage the worm wheel, and an abutment for the worm against which it contacts during driving, said worm being returned by the action of the worm wheel when the power shaft is idle.

In testimony whereof I have hereunto signed my name.

FRANK RICHARD PETERS.